US 6,209,571 B1

(12) United States Patent
Itoh et al.

(10) Patent No.: US 6,209,571 B1
(45) Date of Patent: *Apr. 3, 2001

(54) PROCESS GAS SUPPLY UNIT

(75) Inventors: Masahito Itoh; Toshiyasu Inagaki, both of Kasugai (JP)

(73) Assignee: CKD Corporation, Komaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/074,589

(22) Filed: May 8, 1998

(30) Foreign Application Priority Data

May 13, 1997 (JP) .................................. 9-122525

(51) Int. Cl.[7] .................................................. F16K 51/00
(52) U.S. Cl. ........................... 137/240; 137/602; 137/884
(58) Field of Search ..................... 137/240, 884, 137/597; 251/367

(56) References Cited

U.S. PATENT DOCUMENTS

| | | | |
|---|---|---|---|
| 3,913,886 | * 10/1975 | Di Cicco | 251/215 |
| 4,168,724 | * 9/1979 | Graffunder et al. | 137/884 X |
| 5,137,047 | * 8/1992 | George | 137/240 |
| 5,488,925 | * 2/1996 | Kumada | 137/884 X |
| 5,605,179 | * 2/1997 | Strong Jr., et al. | 137/884 |
| 5,615,730 | * 4/1997 | Hiraoka et al. | 164/4.1 |
| 5,657,786 | * 8/1997 | DuRoss et al. | 137/240 X |
| 5,720,317 | * 2/1998 | Nimberger | 137/884 X |
| 5,727,589 | * 3/1998 | Yokogi | 137/240 |
| 5,749,389 | * 5/1998 | Ritrosi et al. | 137/240 X |
| 5,769,110 | * 6/1998 | Ohmi et al. | 137/884 X |
| 5,819,782 | * 10/1998 | Itafuji | 137/884 X |
| 5,836,355 | * 11/1998 | Markulec et al. | 137/884 |
| 5,860,676 | * 1/1999 | Brzezicki et al. | 137/884 X |
| 5,868,155 | * 2/1999 | Hutton | 137/240 |
| 5,975,112 | * 11/1999 | Ohmi et al. | 137/240 |
| 5,992,463 | * 11/1999 | Redemann et al. | 137/240 X |
| 6,035,893 | * 3/2000 | Ohmi et al. | 137/884 X |

FOREIGN PATENT DOCUMENTS

| | | |
|---|---|---|
| 5-172265 | 7/1993 | (JP) . |
| 9-184599 | 7/1997 | (JP) . |
| 10-026300 | 1/1998 | (JP) . |

* cited by examiner

*Primary Examiner*—Kevin Shaver
*Assistant Examiner*—John Bastianelli
(74) *Attorney, Agent, or Firm*—Finnegan, Henderson, Farabow, Garrett & Dunner, L.L.P.

(57) ABSTRACT

A process gas supply unit has a supply valve for supplying process gas to a semiconductor manufacturing apparatus, a purge valve for supplying inert gas, a check valve provided in a passage between an inert gas source and the purge valve and a common manifold provided with the supply valve, the purge valve and the check valve.

Therefore, these parts are mounted on a mass flow controller as a unit and the process gas unit can be made compact and integrated as a whole.

4 Claims, 11 Drawing Sheets

PROCESS GAS SUPPLY UNIT

BACKGROUND OF THE INVENTION

1. Field of the Invention

The present invention relates to a process gas supply unit used in a semiconductor manufacturing process and, more particularly to a process gas supply unit provided with a process gas supply valve, a purge valve, a check valve and the like.

2. Description of Related Art

Figure 10:
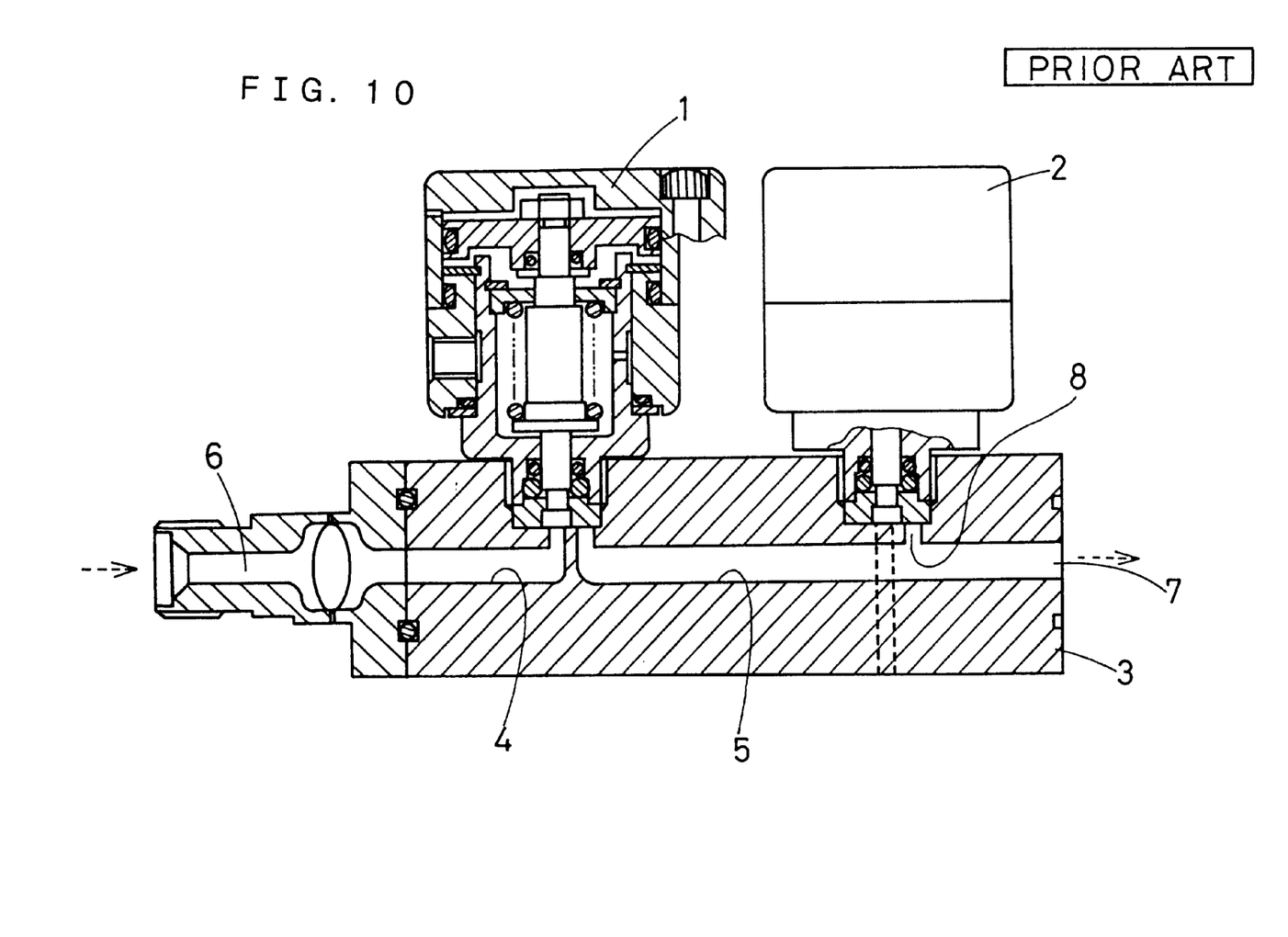
FIG. 10 is a sectional view of a process gas supply unit of the first conventional embodiment.

A process gas supply unit for supplying process gas such as etching gas in a semiconductor manufacturing process has been developed. For example, as shown in FIG. 10, Japanese Published Unexamined Patent Application No. 5-172265 discloses a block manifold provided with two open/close valves 1, 2 in which an input passage 4 through which the input port of the open/close valve communicates with an external entry port 6, an output passage 5 through which the output port of the open/close valve 1 communicates with an external exit port 7 and a communicating passage 8 through which the output port of the open/close valve 2 communicates with the output passage 5.

Figure 7:
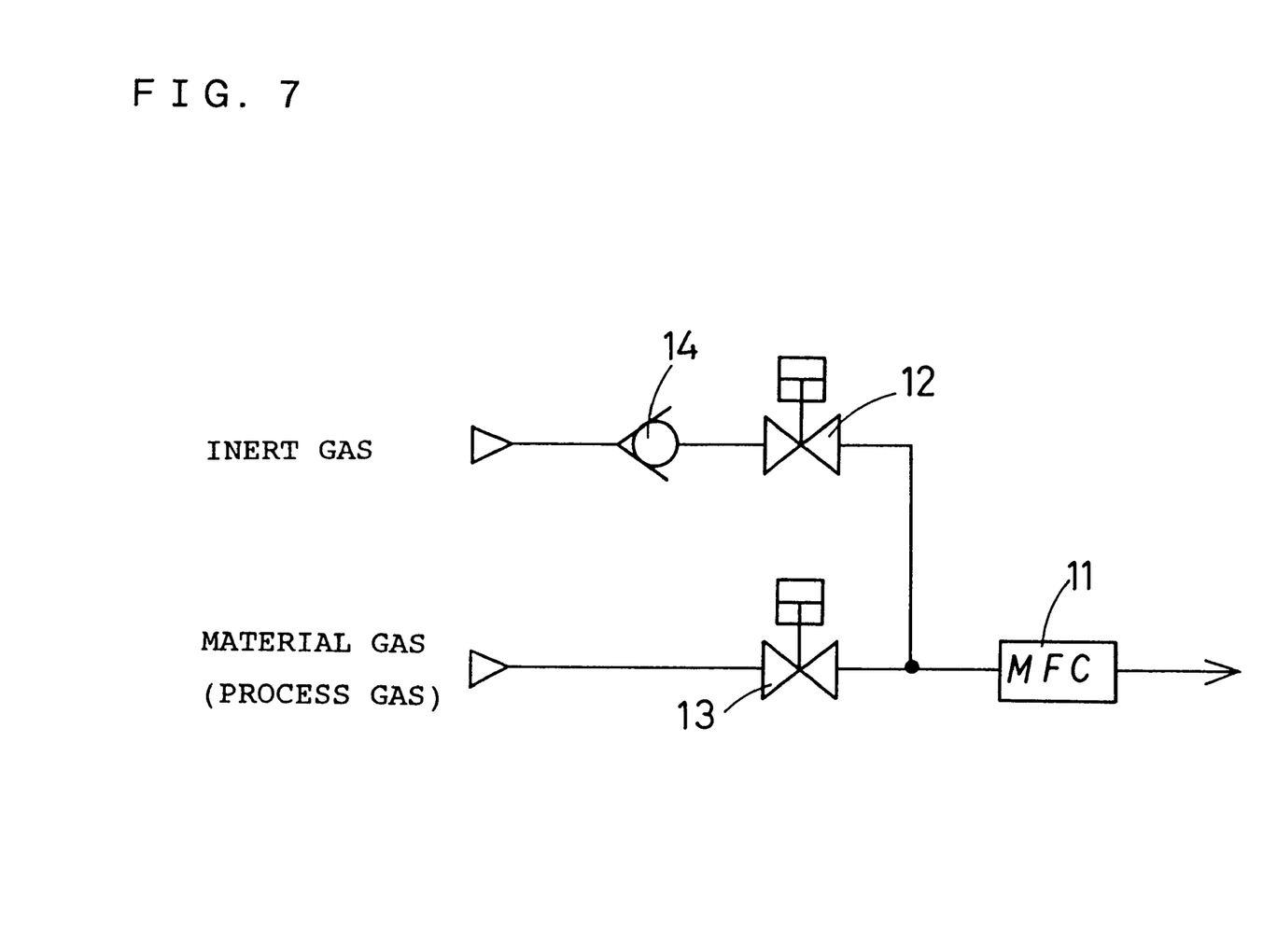
FIG. 7 is a process gas supply circuit of the first preferred embodiment.

However, for example, in a flow chart of a process gas supply shown in FIG. 7, the output port of a supply valve 13 and the output port of a purge valve 12 are connected to the entry port of a mass flow controller 11. The input port of the supply valve 13 is connected to a process gas source. The input port of the purge valve 12 is connected to an inert gas source for purge gas via a check valve 14. The check valve 14 is provided for preventing the reverse flow of the process gas into the inert gas source.

Since a passage through which the purge valve 12 communicates with the check valve 14 in series need to be connected to a process gas line in such a gas supply line, the passage could not be formed in one block manifold according to the technique used in the block manifold disclosed in Japanese Published Unexamined Patent Application No. 5-172265.

Figure 11:
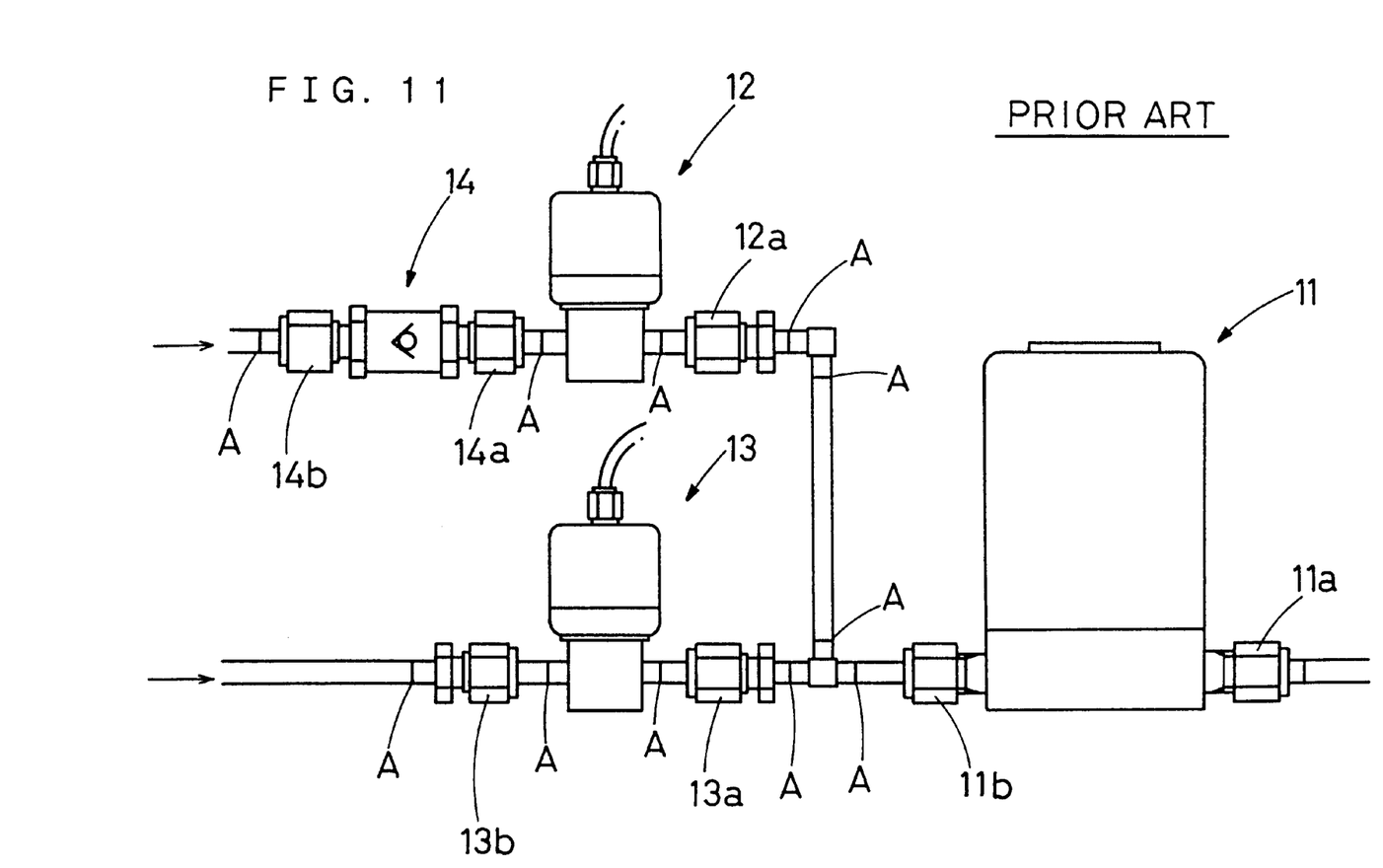
FIG. 11 is a side view of a process gas supply unit of the second conventional embodiment.

Therefore, according to a related art, as shown in FIG. 11, the gas supply line has been constructed by providing joints on both sides of each of a mass flow controller 11, a supply valve 13, a purge valve 12 and a check valve 14 and by butt-welding (A) pipes between the joints.

However, the process gas supply line according to the related art has the following problems.

(1) Although the semiconductor manufacturing apparatus needs to be reduced in size and integrated, the gas supply line shown in FIG. 11 needs large space and hence is opposite to reduction in size and integration.

Further, since many weld portions are made, corrosion resistance is reduced and particles might be generated. When the supply valve 13, the purge valve 12 and the check valve 14 are maintained and are replaced, the joints need to be separated and replaced, which is not suitable for maintenance.

(2) On the other hand, according to the technique disclosed in Japanese Published Unexamined Patent Application No. 5-172265, if the process gas supply line is used only for forming the flow of the process gas, it is possible to mount a plurality of units on a block manifold and to form a passage communicating with the inside of the block manifold. However, it is difficult to connect a passage through which the purge 12 communicates with the check valve 14 in series to this process gas supply line because it produces the other problem.

In other words, since two passages need to be formed in the block manifold and, in this case, extra openings are necessarily made and hence stoppers for closing the extra openings are required, which produces a problem that these stopper might produce new particles. Further, when the process gas is replaced by the purge gas, the process gas remains near the stoppers, which reduces a yield of the semiconductor.

SUMMARY OF THE INVENTION

It is an object of the present invention to solve the above-described problems and to provide a compact integrated process gas supply unit which a purge valve communicating with a check valve in series is connected to a process gas flow.

To accomplish the above-described object, the process gas supply unit according to the present invention has the following constitution:

(1) A process gas supply unit for a semiconductor manufacturing apparatus comprises a supply valve for supplying process gas to the semiconductor manufacturing apparatus, a purge valve for supplying inert gas, a check valve disposed in a passage between an inert gas source and the purge valve and a common manifold on which the supply valve, the purge valve and the check valve are mounted.

(2) In the common manifold described above in (1) are formed a process gas input passage through which the input port of the supply valve communicates with a process gas external entry port, a process gas output passage through which the output port of the supply valve communicates with a process gas external exit port, a purge output passage through which the output port of the purge valve communicates with the process gas output passage, a check valve output passage through which the input port of the purge valve communicates with the output port of the check valve and a purge gas input passage through which the input port of the check valve communicates with a purge gas external entry port.

(3) A process gas supply unit described in (1) further comprises a vacuum valve which is connected to a vacuum pump and is mounted on the manifold.

(4) In the manifold of the process gas supply unit described in (3) are formed a vacuum output passage through which the output port of the vacuum valve communicates with the process gas output passage and a vacuum input passage through which the input port of the vacuum valve communicates with a vacuum external entry port.

(5) The check valve output passage of the process gas supply unit described in (1) or (3) is shaped nearly like a letter V.

Next, the action of the process gas supply unit according to the present invention having the above-described constitution will be described.

Since each of the supply valve, the purge valve, the check valve are mounted by four bolts on the upper side of the block manifold in the above-described process gas supply unit, it can be mounted or removed individually.

Further, since the output port of the purge valve communicates with the output passage of the process gas, the output port of the supply valve and a mass flow controller can be replaced by the purge gas.

In this respect, the check valve is disposed next to the purge valve in the block manifold and the purge gas input passage of the check valve bypasses the output passage of the process gas in a slanting direction and intersects the output passage of the process gas in a torsional relation by a lower side block and a port is formed upward, whereby the check valve can be mounted on and removed from the upper side of the manifold. Further, a purge gas supply tube and the like can be mounted on and removed from the upper side of the manifold by upwardly forming the purge gas external entry port.

Further, in another process gas supply unit, a check valve output passage through which the input port of the purge valve communicates with the output port of the check valve is shaped nearly like a letter V and hence both ports can be connected at a short distance. Furthermore, since only one bending portion can be made, it is unlikely that the process gas remains in the check valve output passage even if the process gas flows in reverse and is stopped by the check valve. Still further, since the V-shaped passage can be made by drilling two slanting holes in opposite directions, it is easy to make the passage and to clean it after it is made, whereby the fine chips produced by drilling, oil and the like can be fully removed.

In another process gas supply unit, the vacuum valve is disposed next to the check valve in the block manifold and hence the vacuum valve can be mounted on and removed from the upper side of the block manifold by four bolts.

Further, the vacuum input passage of the vacuum valve bypasses the output passage of the process gas in a slanting direction and intersects the process gas output passage in a torsional relation by a lower side second passage block and a port is formed upward, whereby the vacuum valve can be mounted on and removed from the upper side of the manifold. Furthermore, a vacuum supply pipe and the like can be mounted on and removed from the upper side of the manifold via a joint by upwardly forming the vacuum entry port.

BRIEF DESCRIPTION OF THE DRAWINGS

The accompanying drawings, which are incorporated in and constitute a part of this specification illustrating an embodiment of the present invention and, together with the description, serve to explain the objects, advantages and principles of the present invention.

In the drawings.

DETAILED DESCRIPTION OF THE PREFERRED EMBODIMENTS

The preferred embodiments of the mounting structure of an open/close valve in accordance with the present invention and the mounting members thereof will be hereinafter described in detail with reference to the accompanying drawings.

Figure 1:
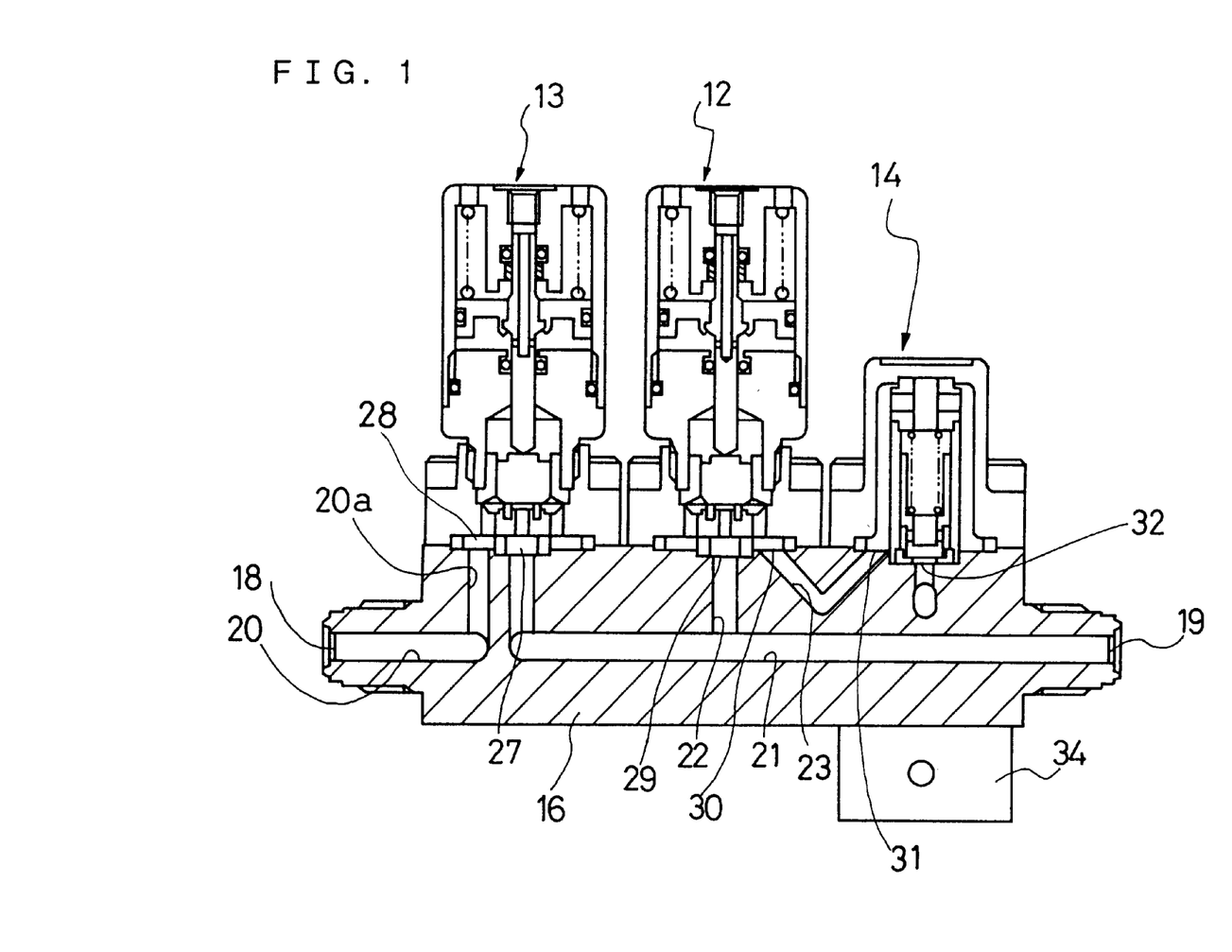
FIG. 1 is a sectional view of a process gas supply unit of the first preferred embodiment.
Figure 2:
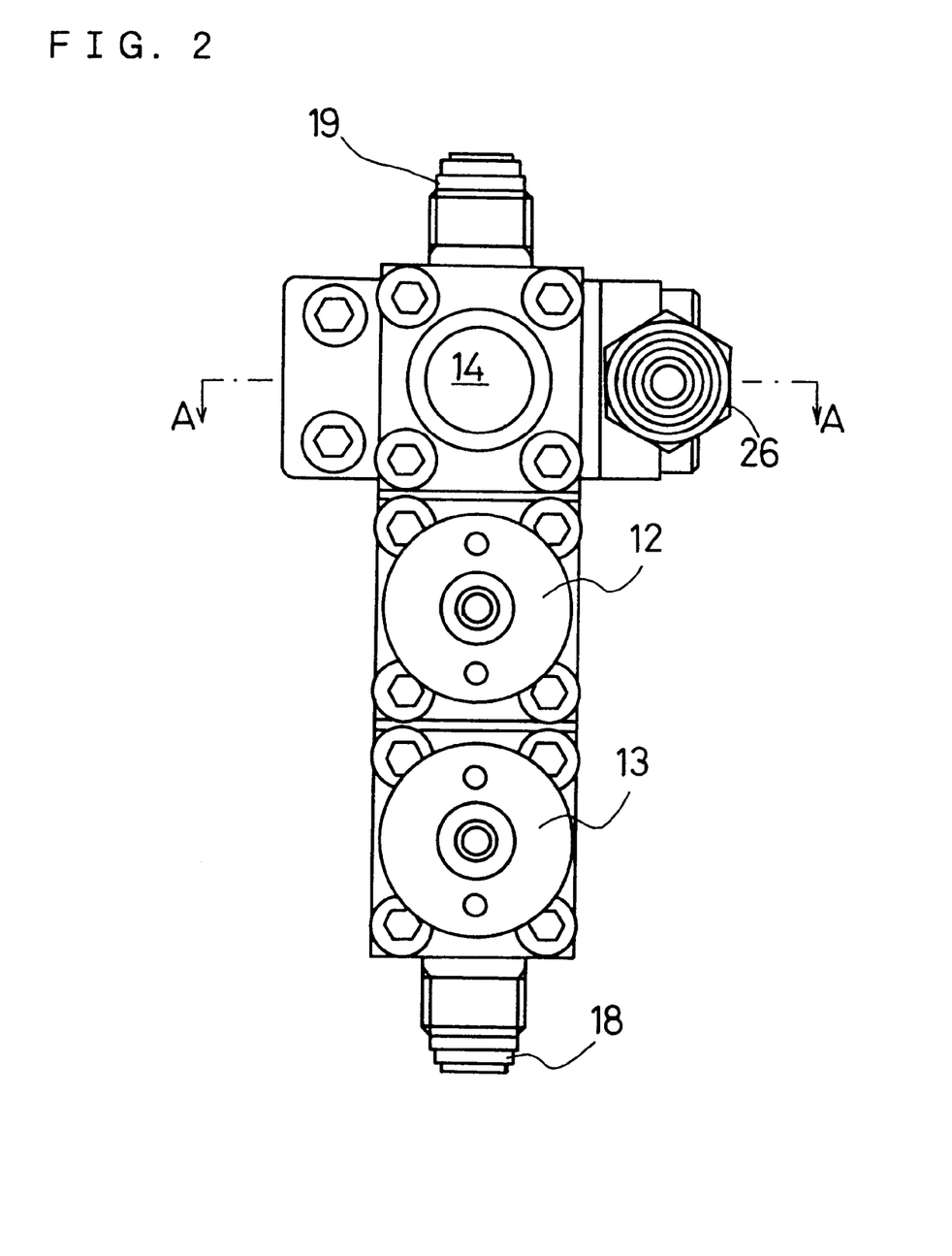
FIG. 2 is a plan view of a process gas supply unit of the first preferred embodiment.
Figure 3:
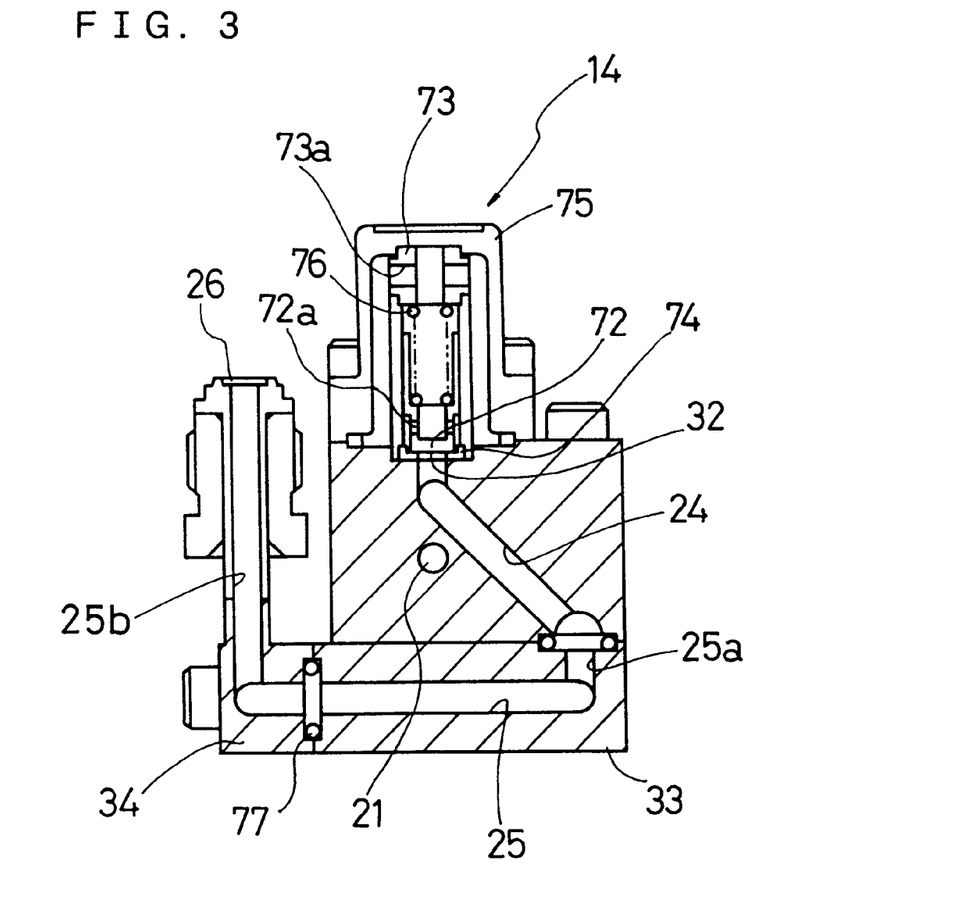
FIG. 3 is a sectional view taken on a line A—A in FIG. 2.

A process gas supply unit of the first preferred embodiment according to the present invention is shown in a sectional view in FIG. 1 and in a plan view in FIG. 2 and in a sectional view taken on a line A—A in FIG. 2 in FIG. 3.

As shown in FIG. 1 and FIG. 2, a supply valve 13 for supplying process gas, a purge valve 12 for supplying purge gas and a check valve 14 for preventing the reverse flow of the purge gas are mounted on the upper side of a manifold 16 formed like a block by four bolts for each valve.

The structures of the supply valve 13, the purge valve 12 and the check valve 14 will be described simply using FIG. 9. In this regard, the same open/close valves are used for the supply valve 13 and the purge valve 12 and hence only the structure of the supply valve 13 will be described. If the same open/close valves are used, they have the same mounting sizes, which is convenient in designing when the valves increase in number, and they have an advantage such that spare parts for replacement decrease in number. Further, the positions of the mounting bolts of the check valve 14 are completely the same positions of those of the supply valve 13 and the purge valve 12. Therefore, the sizes of all parts are unified, which is convenient in designing.

Figure 9:
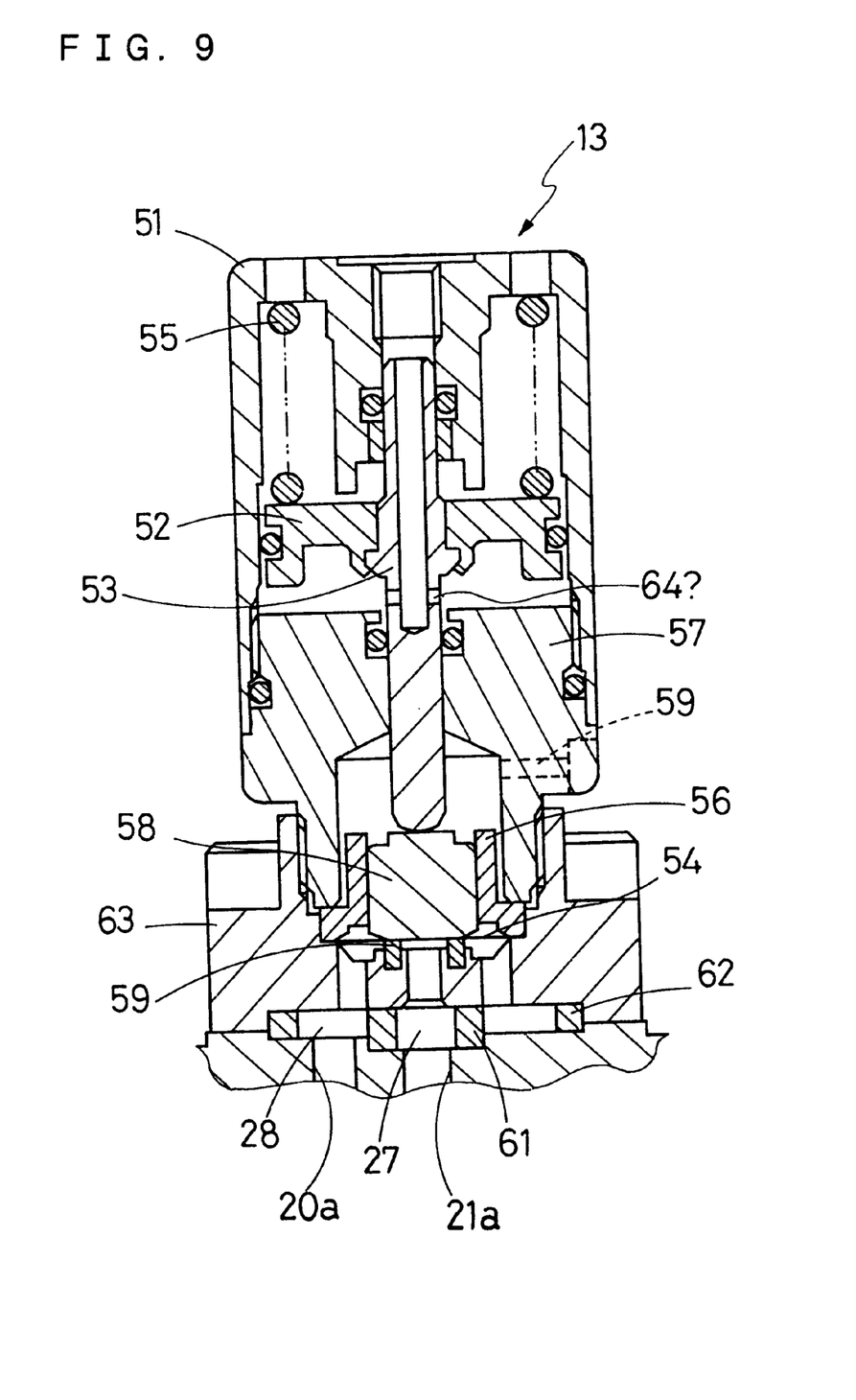
FIG. 9 is a sectional view of an open/close valve used in a process gas supply unit of the present invention.

As shown in FIG. 9, an output port 27 of the supply valve 13 is positioned at the upper end of a vertical passage 21a of a process gas output passage 21 (see FIG. 1). A counter bore is made on the upper end surface of the vertical passage 20a of the manifold 16 and a hollow sealing member 61 is mounted in the counter bore.

In the left side of the vertical passage 21a is formed the vertical passage 20a of the process gas input passage 20. The input port 28 of the supply valve 13 is positioned at the upper end of the vertical passage 20a. A counter bore is made on the surface of the manifold 16 of the outside of the vertical passage 20a and a hollow sealing member 62 is mounted in the counter bore.

A valve seat member 63 having a valve seat 59 on the surface thereof is mounted on the sealing member 61 and the sealing member 62.

A valve element 58 is held on the upper surface of the valve seat 59 such that the valve element 58 can be put into contact with the valve seat 59 or separated therefrom. In other words, a diaphragm 54 is fixed at the periphery by a diaphragm fixing bracket 56 pressed by a middle member 57 which is screwed into a female thread formed in a hole made in the upper portion of the valve seat member 63 and the valve seat member 63. The diaphragm 54 is used between the valve element 58 and the valve seat 59 so as to prevent the leak of the process gas.

A piston rod 53 is slidably held in the center hole of the valve seat member 63. A piston 52 is fixed by crimping in the vicinity of the center of the piston rod 53.

A pilot valve cylinder 51 is fixed on the middle member 57. A restoring spring 55 for biasing downward the piston 52 and the piston rod 53 is mounted in the pilot valve cylinder 51. Further, a port 60 for driving air is formed in an upper surface of the cylinder 51. A through hole 64 for supplying driving air sent through the port 60 to a lower side of the piston 52 is formed below the piston 52 in the center of the piston rod 53.

Next, the action of the open/close valve having the above-described constitution will be simply described.

The piston 52 and the piston rod 53 are biased downward by the restoring spring 55 in a state in which compressed air is not sent in the port 60 for driving air and hence the piston rod 53 puts the valve element 58 into contact with the valve seat 59 via the diaphragm 54. In this respect, the gas pressure of the process gas or the purge gas is applied to the valve element 58 via the valve seat 59 but the valve element 58 is put into contact with the valve seat 59 because the restoring spring 55 is strong, whereby the communication of the output port 27 with the input port 28 is shut.

As shown in FIG. 3, if the compressed air is supplied to the port 60 for driving air, the piston 52 and the piston rod 53 are moved upward. The valve element 58 and the diaphragm 54 are moved upward by the pressure of the process gas or the purge gas, whereby the input port 28 communicates with the output port 27.

The input port 32 of the check valve 14 is positioned at the upper end of a slanting passage 24. A hollow valve seat member 74 in which a counter bore is formed is fixed on the surface of the upper end of the slanting passage 24. A valve element member 72 is slidably held in a cylinder member 75. A restoring spring 76 one end of which is in contact with a bracket 73 urges the valve element member 72 in the direction which puts the valve element member 72 into contact with the valve seat member 74.

A communicating hole 72a through which the outside communicates with the inside is formed in the valve element member 72. Further, a communicating hole 73a through which the outside of the cylinder member 75 communicates with the inside thereof is formed in the bracket 73.

Next, the action of the check valve 14 will be simply described.

A purge pressure is always applied to the input port 32 side and hence an upward force is applied to the valve element member 72 by the purge pressure. Therefore, when the purge valve 12 is open, the pressure in the check valve output passage 23 is reduced and the pressure in the valve element member 72 is reduced, whereby the valve element member 72 is moved upward and the purge gas is flowed from the input port 32 to the exit port 31.

On the other hand, when the purge valve 12 is closed, the pressure in the check valve output passage 23 is increased and the pressure in the valve element member 72 is also increased, whereby the valve element member 72 is moved downward to put the valve element member 72 into contact with the valve seat member 74. Therefore, the purge gas does not flow in reverse from the exit port 31 to the input port 32.

Next, the inner structure of the manifold 16 will be described.

In FIG. 1, a process gas external entry port 18 is formed at the left end of the manifold 16. The process gas external entry port 18 communicates with the input port 28 of the supply valve 13 through a process gas input passage 20. The process gas input passage 20 extends horizontally from the process gas external entry port 18 and is bent in the upward direction of the manifold 16 by the vertical passage 20a.

A process gas external exit port 19 is formed at the right end of the manifold 16. The process gas external entry port 19 communicates with the output port 27 of the supply valve 13 through a process gas output passage 21. The process gas output passage 21 extends horizontally from the process gas external exit port 19 and is bent in the upward direction of the manifold 16 by the vertical passage 21a.

The output port 29 of the purge valve 12 communicates with the process gas output passage 21 through a purge output passage 22. Further, the input port 30 of the purge valve 12 communicates with the output port 31 of the check valve 14 through a check valve output passage 23 shaped nearly like a letter V, as shown in FIG. 1.

A lower side passage block 33 and a lower side passage second block 34 are fixed to the bottom surface of the manifold 16. As shown in FIG. 3, the input port 32 of the check valve 14 communicates with a purge gas external entry port 26 through a slanting passage 24 and an intersecting passage 25 having a vertical passage 25a and a vertical passage 25b. A purge gas input passage is constituted by the slanting passage 24 and the intersecting passage 25.

Next, the working method of these passages will be simply described.

The check valve output passage 23 is made as follows: a hole is drilled in the manifold from the input port 30 at an angle of 45 degrees in a slanting direction and then another hole is drilled symmetrically with respect to a line from the output port 31 at an angle of 45 degrees in a slanting direction and then these holes are made to communicate with each other at the tip ends thereof. Then, the chips are cleaned by a cleaning agent to remove particles.

The slanting passage 24 is made as follows: a hole is drilled in the manifold to the middle from the bottom side hole at an angle of 45 degrees in a slanting direction and then another hole is drilled vertically from the top surface and then these holes are made to communicate with each other. The intersecting passage 25 is made by making the intersecting holes communicate with each other. The lower side passage block 33 is connected to a lower side passage second block 34 via a leak preventing gasket 77.

Next, the action of the process gas supply unit according to the present invention having the above-described constitution will be described.

The process gas external exit port 19 is connected to a vacuum chamber of a semiconductor manufacturing process via a mass flow controller not shown. The process gas external entry port 18 is connected to a supply source of the process gas.

The process gas is made to flow from the process external exit port 19 to the mass flow controller through the process gas input passage 20, the input port 28, output port 27 and the process gas output passage 21 by opening the supply valve 13 in a state in which the purge valve 12 is closed.

When the mass flow controller detects a predetermined amount of the process gas flowing, the supply valve 13 is closed to stop the supply of the process gas. Then, the exit port side of the mass flow controller is changed from the vacuum chamber to purging means.

Then, the purge valve 12 is opened to flow inert gas, for example, nitrogen gas as the purge gas to the process gas output passage 21 through the purge gas external entry port 26, the intersecting passage 25, the slanting passage 24, the input port 32, the output port 31, the check valve output passage 23, the input port 30, the output port 29 and the purge output passage 22, which can purge the process gas remaining in the process gas output passage 21 and the mass flow controller. It is advantageous because a passage wall and the like is corroded by the process gas if the process gas remains in the process gas output passage 21 and the mass flow controller.

When the purging is finished, the purge valve 12 is closed. The purge gas remaining in the check valve output passage 23 is not flowed in reverse to the slanting passage 24 by the check valve 14.

As mentioned above, since each of the supply valve 13, the purge valve 12 and the check valve 14 is mounted on the upper side of the manifold 16 with four bolts, it can be removed and mounted individually.

The check valve 14 is arranged next to the purge valve 12 on the top surface of the manifold 16 and the slanting passage 24 of the check valve 14 bypasses the process gas output passage 21 in a slanting direction and intersects the process gas output passage 21 in torsional relation by the intersecting passage 25 formed in the lower side passage block 33 and the input port 32 is formed upward. Therefore, the check valve 14 can be mounted on and removed from the upper side of the manifold 16.

Further, the purge gas external entry port 26 can be formed upward and a purge gas supply tube and the like can be mounted on and removed from the upper side via a joint.

Since the check valve output passage 23 through which the input port 30 of the purge valve 12 communicates with the exit port 31 of the check valve 14 is shaped nearly like a letter V, both ports can be connected to each other at a short distance. Further, since the bending portion is limited to only one portion, it is unlikely that the process gas remains in the check valve output passage even if the process gas is flowed in reverse and is stopped by the check valve. Since the V-shaped passage is made by drilling two slanting holes which are opposite in direction, it is easy to make it and to clean it after it is made and hence the fine chips made by the drilling work, oil and the like can be fully removed.

As described above in detail, the process gas supply unit of the first preferred embodiment has the manifold 16 and the lower side passage block 33 in which the process gas input passage 20 through which the input port 28 of the supply valve 13 communicates with the process gas external entry port 18, the process gas output passage 21 through which the output port 27 of the supply valve 13 communicates with the process gas external exit port 19, the purge output passage 22 through which the output port 29 of the purge valve 12 communicates with the process gas output passage 21, the check valve output passage 23 through which the input port 30 of the purge valve 12 communicates with the output port 31 of the check valve 14, and the slanting passage 24 and the intersecting passage 25 through which the input port 32 of the check valve 14 communicates with the purge gas entry port 26 are formed. Therefore, each of the supply valve 13, the purge valve 12 and the check valve 14 is mounted on the upper side of the manifold 16 with four bolts and hence it can be removed and mounted individually. Further, since the check valve output passage 23 is formed like a letter V, it does not need an extra stopper and can reduce a possibility that particles may be generated.

Further, since the check valve 14 is arranged next to the purge valve 12 on the manifold 16 and the slanting passage 24 of the check valve 14 bypasses the process gas output passage 21 in a slanting direction and intersects the process gas output passage 21 in torsional relation by the lower side passage block 33 and the purge gas external entry port 26 is formed upward, the check valve 14 can be mounted on and removed from the upper side of the manifold 16. Furthermore, the purge gas external entry port 26 can be formed upward and a purge gas supply tube and the like can be mounted on and removed from the upper side of the manifold via a joint.

Figure 8:
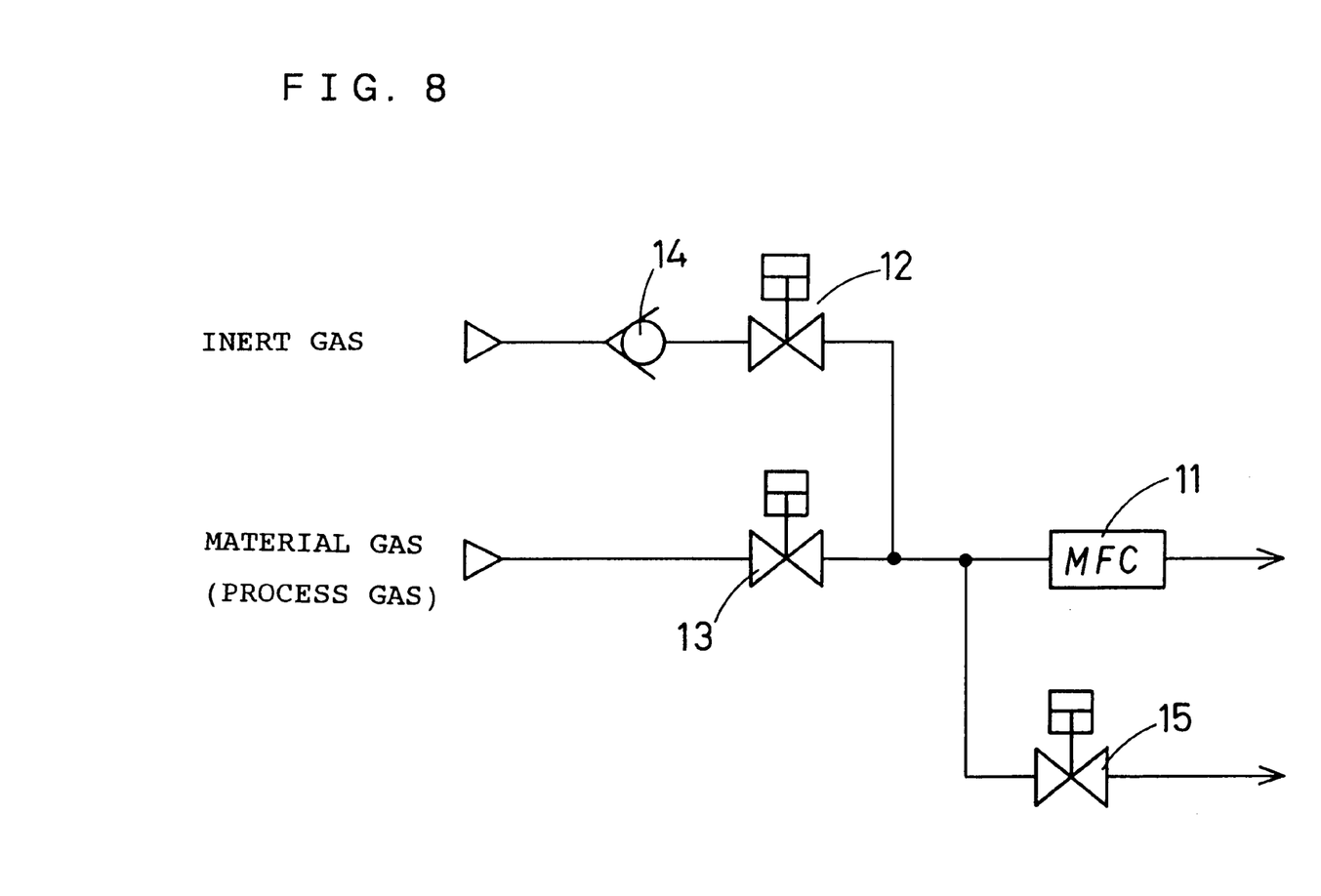
FIG. 8 is a process gas supply circuit of the second preferred embodiment.

Next, the second preferred embodiment of the present invention will be described. The second preferred embodiment, as shown in FIG. 8, is constituted by adding a vacuum valve 15 connected to a vacuum pump P to the first preferred embodiment and utilizes the first preferred embodiment except for the vacuum valve 15. Therefore, like reference numerals indicate like constitution elements in the drawing and the description of these elements will be omitted.

It is an object of the vacuum valve 15 to effectively remove the process gas by repeatedly sucking the process gas by the vacuum valve 15 and purging it by the purge valve 12 because it is difficult or takes much time to remove the process gas adhered to the wall surface only by pouring the purge gas.

Figure 4:
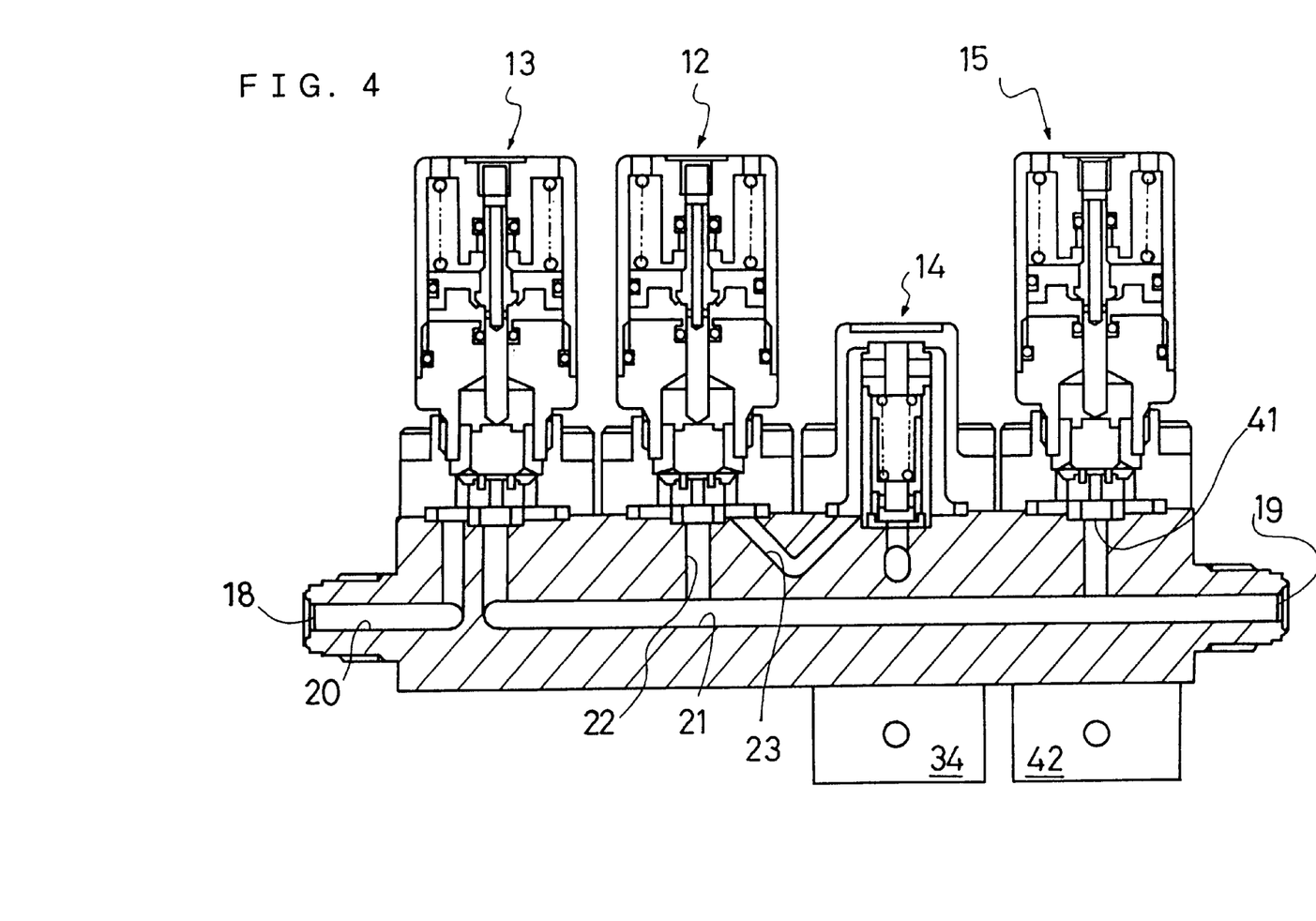
FIG. 4 is a sectional view of a process gas supply unit of the second preferred embodiment.
Figure 5:
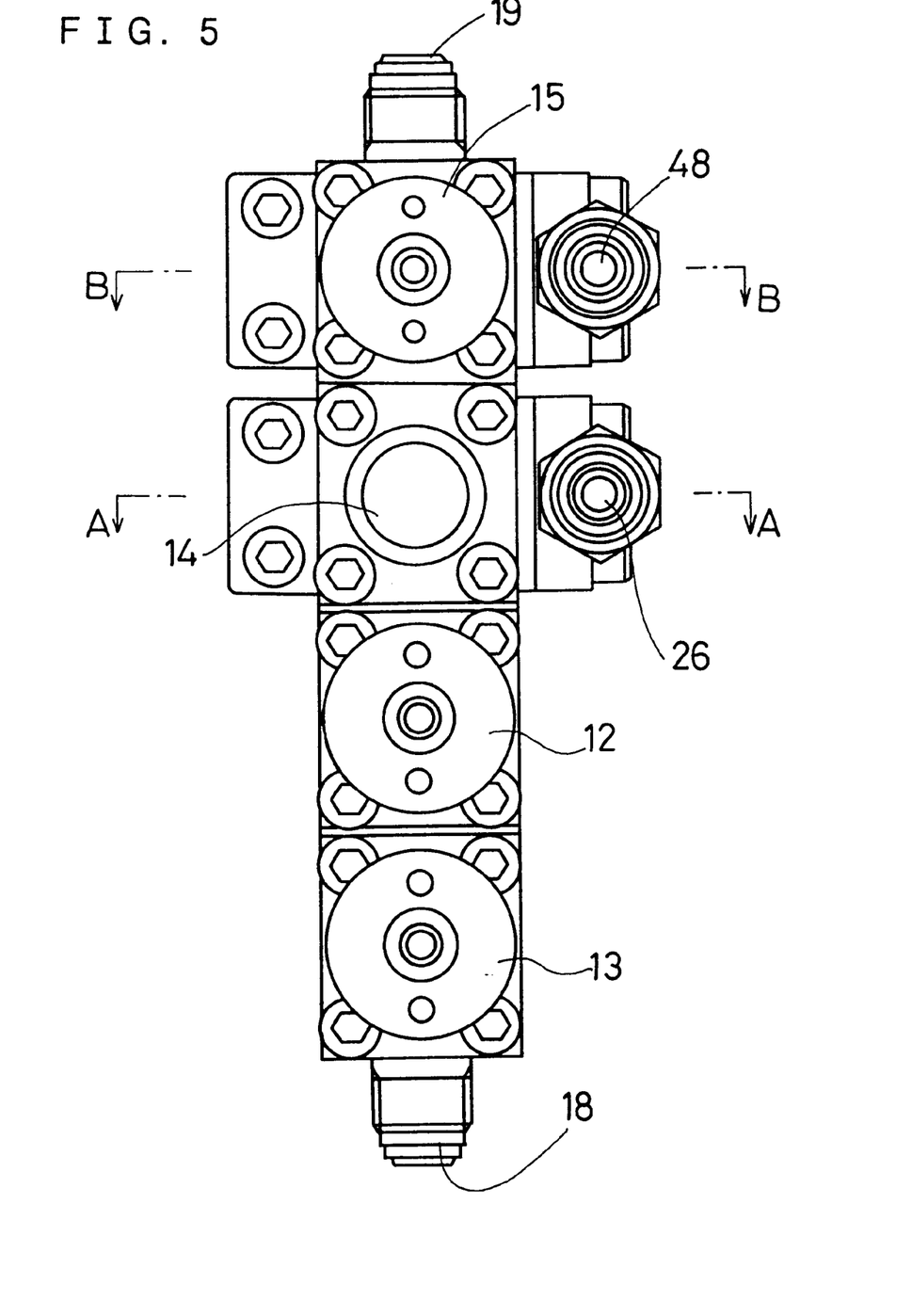
FIG. 5 is a plan view of a process gas supply unit of the second preferred embodiment.
Figure 6:
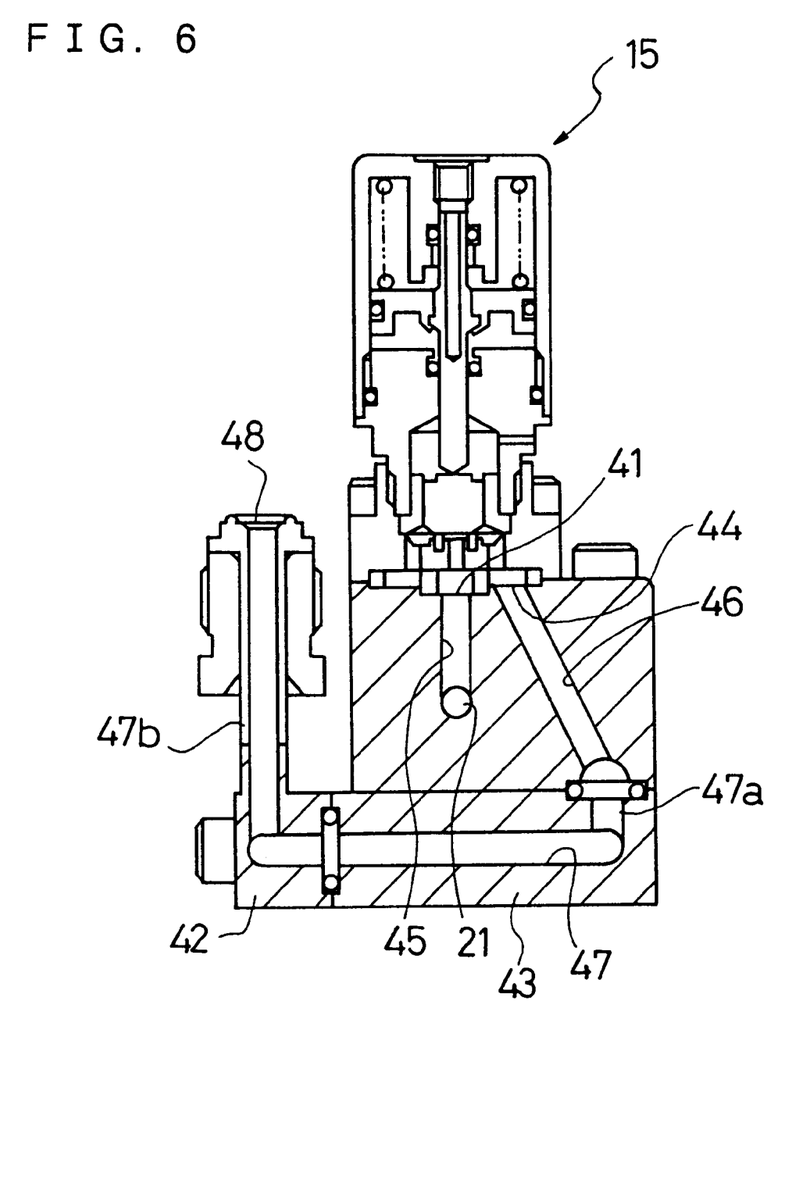
FIG. 6 is a sectional view taken on a line B—B in FIG. 5.

A process gas supply unit of the second preferred embodiment according to the present invention is shown in a sectional view in FIG. 4 and in a plan view in FIG. 5 and in a sectional view taken on a line B—B in FIG. 5 in FIG. 6. Further, the sectional view taken on a line A—A in FIG. 5 is the same as FIG. 3.

As shown in FIG. 4 and FIG. 5, a supply valve 13 for supplying process gas, a purge valve 12 for supplying purge gas, a check valve 14 for preventing the reverse flow of the purge gas and a vacuum valve 15 for sucking the process gas are mounted on the upper side of a manifold 16 by four bolts for each valve.

The structure of the vacuum valve 15 is the same as the structures of the supply valve 13 and the purge valve 12 and hence the description thereof will be omitted.

Next, the inner structure of the manifold 16 will be described.

Since the mounting structures and formed passages related to the supply valve 13, the purge valve 12 and the check valve 14 is the same as those of the first preferred embodiment, the description thereof will be omitted and those related to the vacuum valve 15 will be described.

A lower side passage block 43 and a lower side passage second block 42 are fixed side by side to the bottom surface of the manifold 16 with a lower side passage block 33 and a lower side passage second block 34. As shown in FIG. 6, the input port 44 of the vacuum valve 15 communicates with a vacuum external entry port 48 through a slanting passage 46 and an intersecting passage 47 having a vertical portion 47a and a vertical portion 47b. A vacuum input passage is constituted by the slanting passage 46 and the intersecting passage 47.

On the other hand, the output port 41 of the vacuum valve 15 communicates with a process gas output passage 21 through a vacuum output passage 45.

Next, the different points of the second preferred embodiment having the above-described constitution from the first preferred embodiment in the action of the process gas supply unit will be simply described.

When the process gas remaining in the process gas output passage 21 and the like is replaced by the purge gas after the supply of the process gas is finished, the supply valve 13 is closed and then the vacuum valve 15 is opened first to suck the remaining process gas from the vacuum external entry port 48 for a predetermined time, for example, one minute, via the slanting passage 46 and the intersecting passage 47. Then, the purge valve 12 is opened to purge the process gas by the purge gas. The replacement of the process gas by the purge gas can be finished within a short time by repeating this sucking and purging.

As described above, the process gas supply unit of the second preferred embodiment has the manifold 16 and the lower side passage block 33 and the lower side passage block 43 in which the process gas input passage 20 through which the input port 28 of the supply valve 13 communicates with the process gas external entry port 18, the process gas output passage 21 through which the output port 27 of the supply valve 13 communicates with the process gas external exit port 19, the purge output passage 22 through which the output port 29 of the purge valve 12 communicates with the process gas output passage 21, the check valve output passage 23 through which the input port 30 of the purge valve 12 communicates with the output port 31 of the check valve 14, the slanting passage 24 and the intersecting passage 25 through which the input port 32 of the check valve 14 communicates with the purge gas external entry port 26, the vacuum output passage 45 through which the output port 41 of the vacuum valve 15 communicates with the process gas output passage 21, and the slanting passage 46 and the intersecting passage 47 through which the input port 42 of the vacuum valve 15 communicates with the vacuum external entry port 48 are formed. Therefore, each of the supply valve 13, the purge valve 12, the check valve 14 and the vacuum valve is mounted on the upper side of the manifold 16 with four bolts and hence it can be removed and mounted individually. Further, since the check valve output passage 23 is shaped like a letter V, it does not need an extra stopper and can reduce a possibility that particles may be generated.

While the present invention has been described in conjunction with the preferred embodiment thereof, it is not intended to limit the present invention to the above-described embodiments. On the contrary, the present invention can be implemented within the spirit and scope of the present invention as follows.

For example, a cylinder type pilot valve is used as an open/close valve in the preferred embodiments but a solenoid valve type pilot valve can be also used. Further, it is more preferable that each of the process gas external entry port 18 and the process gas external exit port 19 be provided with a block designed specifically therefor and the tube therefor can be mounted and removed from the upper side thereof.

Since the process gas supply unit according to the present invention has the supply valve for supplying the process gas to the semiconductor manufacturing device, the purge valve for supplying the inert gas, the check valve disposed in the passage between the inert gas source and the purge valve therefor and one common manifold provided with the above-described supply valve, the above-described purge valve and the above-described check valve, these valves can be mounted on the mass flow controller as one unit. Therefore, the process gas supply unit can be integrated and made compact.

The process gas supply unit according to the present invention has the block-like manifold in which the process gas input passage through which the input port of the supply valve communicates with the process gas external entry port, the process gas output passage through which the output port of the supply valve communicates with the process gas external exit port, the purge output passage through which the output port of the purge valve communicates with the process gas output passage, the check valve output passage through which the input port of the purge valve communicates with the output port of the check valve and the purge gas input passage through which the input port of the check valve communicates with the purge external entry port are formed. Therefore, each of the supply valve, the purge valve and the check valve is mounted on the upper side of the manifold with four bolts and hence it can be removed and mounted individually. Further, since the check valve output passage is shaped like a letter V, it does not need an extra stopper and can reduce a possibility that particles may leak outside.

What is claimed is:

1. A process gas supply unit for a semiconductor manufacturing apparatus comprising:

a supply valve for supplying process gas to the semiconductor manufacturing apparatus;

a purge valve for supplying inert gas;

a check valve disposed in a passage between an inert gas source and the purge valve;

a single-piece manifold, the supply valve, the purge valve and the check valve being mounted in alignment on the single-piece manifold so that the check valve is positioned next to the purge valve;

the single-piece manifold including:
      a process gas output passage that communicates an output port of the supply valve with an external process gas exit port
      a purge gas input passage that communicates an input port of the check valve with an external purge gas entry port; and a lower side block disposed under the single-piece manifold;

wherein the purge gas input passage extends in an inclined direction to bypass the process gas output passage, extends within the lower side block under the process gas output passage and communicates with an upwardly opening connecting port.

2. A process gas supply unit as claimed in claim 1, wherein each of the supply valve, the purge valve, and the check valve has an input port and an output port, and wherein the single-piece manifold further includes:

a process gas input passage that communicates the input port of the supply valve with an external process gas entry port;

a purge output passage that communicates the output port of the purge valve with the process gas output passage.

3. A process gas supply unit for a semiconductor manufacturing apparatus comprising:

a supply valve for supplying process gas to the semiconductor manufacturing apparatus;

a purge valve for supplying inert gas;

a check valve disposed in a passage between an inert gas source and the purge valve;

a single-piece manifold, the supply valve, the purge valve and the check valve being mounted in alignment on the single-piece manifold so that the check valve is positioned next to the purge valve, the single-piece manifold including a process gas output passage that communicates an output port of the supply valve with an external process gas exit port;

a vacuum valve connected to a vacuum pump and mounted on the single-piece manifold, the supply valve, the purge valve, the check valve, and the vacuum valve being aligned on one surface of the manifold;

a lower side block disposed under the single-piece manifold;

wherein a vacuum output passage that communicates the output port of the vacuum valve with the process gas output passage, and a vacuum entry port, are formed in the single-piece manifold; and wherein the purge gas input passage extends in an inclined direction to bypass the process gas output passage, extends within the lower side block under the process gas output passage, and communicates with an upwardly opening connecting port.

4. A process gas supply unit as claimed in claim 3, further including a second lower side block disposed under the single-piece manifold, wherein the vacuum input passage extends in an inclined direction to bypass the process gas output passage, extends within the second lower side block under the process gas output passage, and communicates with an upwardly opening connecting port.

* * * * *